United States Patent [19]

Roberts et al.

[11] 4,303,959

[45] Dec. 1, 1981

[54] FAIL SAFE SURGE ARRESTER SYSTEMS

[75] Inventors: Charles A. Roberts, Rosedale, N.Y.; Raymond D. Jones, Cheam, England

[73] Assignee: TII Industries, Inc., Lindenhurst, N.Y.

[21] Appl. No.: 64,779

[22] Filed: Aug. 8, 1979

Related U.S. Application Data

[63] Continuation of Ser. No. 843,320, Oct. 18, 1977, abandoned.

[51] Int. Cl.[3] .......... H02H 9/04

[52] U.S. Cl. .......... 361/124; 361/119; 337/32; 337/33

[58] Field of Search .......... 361/124, 120, 117, 118, 361/119, 125, 56, 129; 337/32, 33, 34; 313/306

[56] References Cited

U.S. PATENT DOCUMENTS

| | | | |
|---|---|---|---|
| 959,120 | 5/1910 | Dean | 361/117 X |
| 1,457,249 | 5/1923 | Janson et al. | 361/124 |
| 3,254,179 | 5/1966 | Howard . | |
| 3,281,625 | 10/1966 | Wanaselja . | |
| 3,340,431 | 9/1967 | Wanaselja . | |
| 3,497,751 | 2/1970 | Cullis, Jr. . | |
| 3,522,570 | 8/1970 | Wanaselja . | |
| 4,031,429 | 6/1977 | Holz et al. . | |
| 4,034,326 | 7/1977 | Hill et al. | 361/124 X |
| 4,056,840 | 11/1977 | Lundsgaard et al. | 361/124 |
| 4,062,054 | 12/1977 | Simokat | 361/124 X |
| 4,129,894 | 12/1978 | Chen | 361/124 X |

*Primary Examiner*—Patrick R. Salce
*Attorney, Agent, or Firm*—Morgan, Finnegan, Pine, Foley & Lee

[57] ABSTRACT

Laminar air gap devices include two overlapping conductive layers separated by a non-metallic insulating layer. The insulating layer is perforated to provide at least one air gap between the conductive layers. The devices are positioned between a line electrode and ground electrode of a gas filled surge arrester and resiliently retained thereon by conductive clips. Non-metallic fusible elements, preferably plastic, are interposed between the clip legs and the associated electrode. The fusible element may also be the insulating layer between the conductive layers.

36 Claims, 15 Drawing Figures

FAIL SAFE SURGE ARRESTER SYSTEMS

This is a continuation of application Ser. No. 843,320, filed Oct. 18, 1977 and now abandoned.

CROSS-REFERENCE TO RELATED APPLICATION

This application is related to commonly assigned U.S. Application Ser. No. 719,077, filed Aug. 31, 1976 and Ser. No. 741,247, filed Nov. 12, 1976, the disclosures of which are incorporated herein.

BACKGROUND

Gas tube overvoltage protectors are widely used for the protection of equipment from overvoltage conditions which may be caused by lightning, high voltage line contact, and the like.

It is also a widely practiced technique to associate various fail-safe arrangements with such tubes and with other types of protectors, e.g., air gap arresters, to meet various contingencies. For example, the presence of a sustained overload, as where a power line has come in continued contact with a protected telephone line, produces a concomitant sustained ionization of the gas tube and the resultant passage of heavy currents through the tube. Such currents will in many cases destroy the overvoltage protector and may also constitute a fire hazard.

One common approach to this problem is to employ fusible elements which fuse in the presence of such overloads and provide either a permanent short circuiting of the arrester directly, or function to release another mechanism, e.g., a spring loaded shorting bar, which provides the short circuit connection (commonly, the arrester electrodes are both shorted and grounded). The presence of the permanent short and ground condition serves to flag attention to that condition thus signalling the need for its inspection or replacement. Examples of this type of fail-safe protection are found in U.S. Pat. Nos. 3,254,179; 3,281,625; 3,340,431; 3,396,343; and 3,522,570. Several of these patents also incorporate with the fail-safe feature, a backup air gap arrangement so that there is both fail-safe fusible (short) type protection as well as backup air gap protection.

Still another approach, disclosed in commonly assigned application Ser. No. 719,077, is based on the discoveries that an effective fail-safe function can be achieved by employing a non-metallic fusible material and that important advantages are consequently realized. The fusible material is an electrical insulator which in the exemplary embodiments is interposed between one or more of the electrodes and the shorting mechanism. Surprisingly, the response of the non-metallic material to thermal conditions is precise and, moreover, does not leave an insulative film in the course of fusing which might otherwise interfere with the short circuit contact.

The need exists, nonetheless, to develop fail-safe arrangements which provide both surge and failure protection for gas tube arresters.

SUMMARY

The present invention is directed to fail-safe surge arrester assemblies in which both back-up surge and air gap back-up protection is provided with economically producible systems.

Accordingly, the present invention may be summarized as follows:

A gas tube assembly having a short circuit clip biased toward a short circuit connection with the tube electrodes, with safety means interposed between one electrode and the clip, the safety means including two overlapping layers of metallic conductors in contact with the clip and electrode respectively, and an intermediate layer of insulating material interposed between metallic layers and defining an air gap therebetween. The clip is maintained out of contact with the one electrode by fusible material which may be the insultaing layer or a separate element.

In one embodiment the safety means is positioned on the ground electrode of the gas tube. In other embodiments the safety means contacts both the ground electrode and line electrode. The safety means is adapted for use with gas tubes having one or more line electrodes.

DETAILED DESCRIPTION

Figure 1:
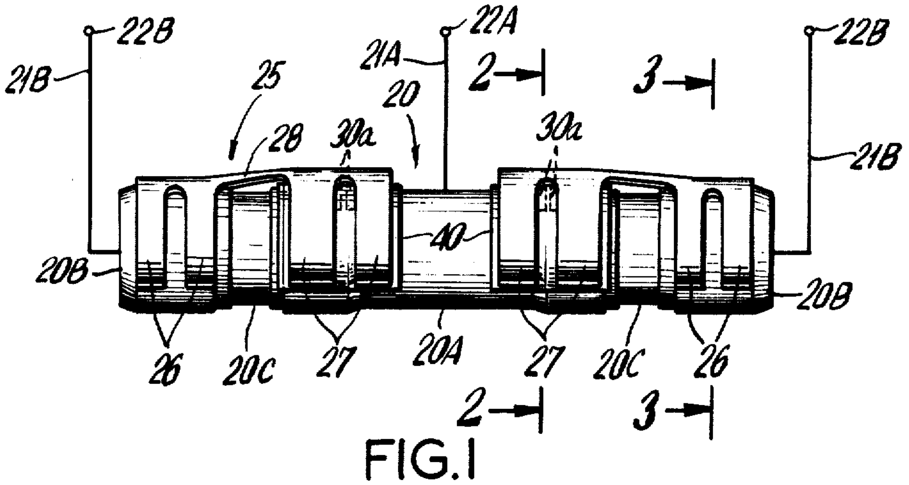
FIG. 1 is an elevation view, partly in schematic, of a gas filled arrester with a first embodiment of this invention.

While this invention is susceptible of embodiment in many different forms, there is shown in the drawings and will hereinafter be described in detail a preferred embodiment of the invention, and modifications thereto, with the understanding that the present disclosure is to be considered as an exemplification of the principles of the invention and is not intended to limit the invention to the embodiments illustrated.

In the embodiment illustrated in FIGS. 1-3 and 6-9, a gas tube 20 is provided, the tube including a center body 20A and electrode end caps 20B each separated from the center body 20A by a respective insulated sleeve section 20C.

The arrester 20, which is of known construction and may comprise for example TII Model 31, has its end electrodes (not shown) extending inwardly from the end caps 20B toward the center of the tube interior to define a gap between the electrodes. Spacing and dimensions are such that each electrode also forms a gap with the center body conductive casing section 20A.

The tube is filled with a gas and the electrode end caps 20B are each provided as by welding with a lead 21B and terminal 22B, e.g., a spade lug, for connection to the circuit to be protected. Center body 20A is likewise provided with a lead 21A welded thereto and the associated connection 22A for connection to ground.

In the presence of overvoltage conditions the gas in tube 20 ionizes thereby creating in known manner, conductive shunting paths between each line of the protected circuit and ground (via the respective terminal lead 21B and ground lead 21A).

A short circuiting means 25, illustrated as a clip, is disposed between each line electrode 20B and the ground electrode 20A. Clip 25 is illustrative, since it will be understood by those skilled in the art that other clip arrangements are readily adaptable to this function.

Figure 7:
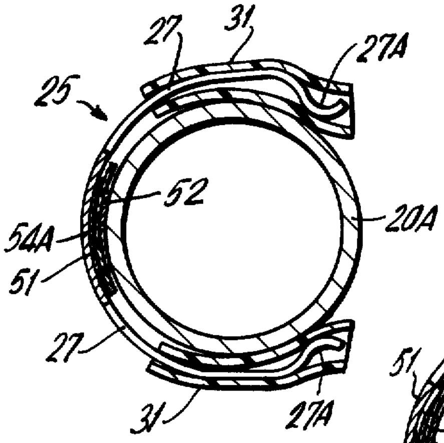
FIG. 7 is a cross-sectional view taken along line 7—7 in FIG. 6 and illustrating an air gap device and clip with fusible material on the clip legs.
Figure 8:
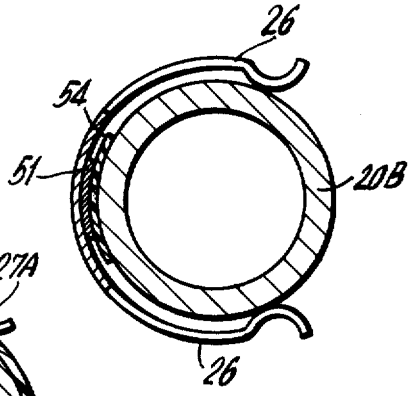
FIG. 8 is a cross-sectional view taken along line 8—8 in FIG. 6.

Each clip 25, which is illustratively of grain oriented tin plated carbon steel, heat treated for stress relief from hydrogen embrittlement after plating, includes a first set of spring fingers 26 resiliently engaging, respectively, end cap (line electrode) 20B and another set of spring fingers 27 disposed about center body (ground electrode) 20A. The spring fingers 26 and 27 are integrally connected by the bridge section 28 of each clip. The spring fingers 26, as best illustrated in FIGS. 3 and 8, are in direct contact with the end caps 20B to provide electrical contact therewith. Conversely, as shown in greater detail in FIGS. 2, 7 and 9, the fingers 27 of the short-circuit clips are spaced from contact with center body 20A by reason of fusible elements 30, 31 and 32 described in greater detail below. Specifically, each of the fingers 27 includes a contact portion 27A which is urged in the direction of contact with grounded center body 20A and which consequently presses resiliently on the fusible member interposed therebetween.

Fusible elements 30, 31 and 32 are of non-metallic, electrically insulative composition. Suitable materials will have melt temperatures in the range corresponding to thermal conditions at arrester thermal overload and will have suitable dielectric strength, dielectric constant, dissipation factor and volume and surface resistivity to provide the requisite insulative function. The preferred material should also be free of embrittlement or plastic flow due to aging and high ambient temperature effects, be non-inflammable under the overload conditions, have good mechanical properties and be inert to corrosives and weather.

Exemplary of such a class of materials are certain of the fluoroplastics, such as fluorinated ethylene propylene polymer (FEP), the polymer perfluoroalkoxy (PFA), the modified copolymer of ethylene and tetrafluoroethylene (ETFE) (marketed under the DuPont Company trademark Tefzel), and poly (ethylene-chlorotrifluoro-ethylene)(E-CTFE copolymer) marketed under the Allied Chemical Corporation mark Halfar. (The fluoroplastic polytetrafluoroethylene (TFE), on the other hand, does not have suitable melt properties for the illustrated application.) In the examples, element 30 is formed of FEP film, and 31 and 32 are formed of approximately 38" long FEP tubing, sizes AWG 6 and 2, respectively.

With reference to the embodiment of FIGS. 1-5, fusible element 30 is generally rectangular in shape and interposed between a first layer 35 and a second layer 36 of conductive material, e.g., copper. Layers 35 and 36 are generally rectangular in shape and in register but smaller in dimensions than layer 30 so that layer 30 extends beyond the periphery of the conductive layers. Insulative layer 30 includes two rectangular openings 30A which together with the thickness of the layer 30 provide a pair of air gaps between the first and second layers. Preferably, the air gap is about 3 mils and provides a strike voltage in the range of 500 to 1000 volts.

Figure 2:
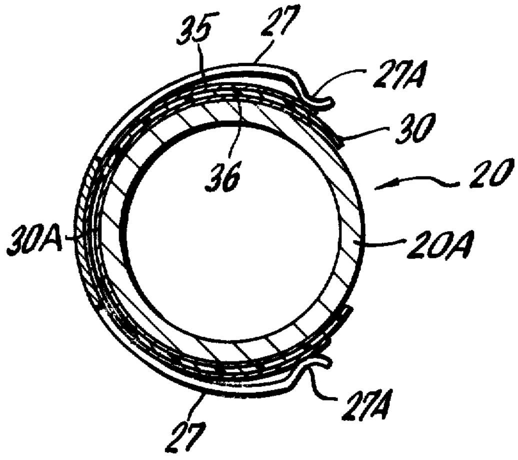
FIGS. 2 and 3 are cross-sectional views taken along lines 2—2 and 3—3, respectively, in FIG. 1.
Figure 3:
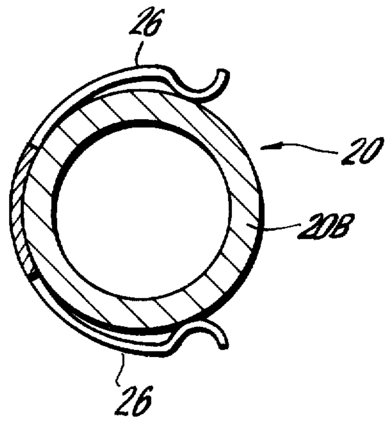
Figure 4:
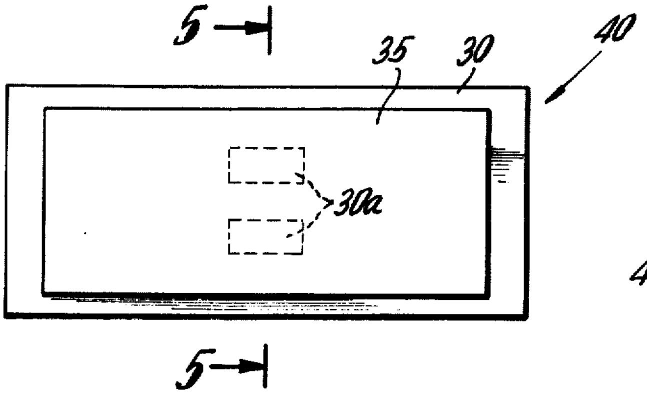
FIG. 4 is an enlarged plan view of the air gap device shown in FIG. 1.
Figure 5:
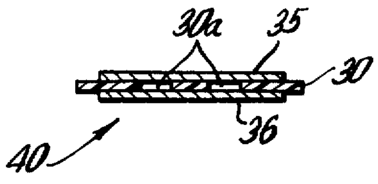
FIG. 5 is a cross-sectional view taken along line 5—5 in FIG. 4.

The entire assembly 40 including the first and second layers 35 and 36 and insulative layer is a safety device which is positioned circumferentially about the center body 20A as shown in FIGS. 1 and 2. Fingers 27 engage copper layer 35 and bias it against fusible layer 30, layer 36, and center body 20A.

During normal operation of the arrester 20, transient surges produce ionization in the normal manner to protect the subject equipment. If, however, a sustained surge condition occurs as where a line is permanently contacted by a higher voltage line, the resultant ionization currents flowing through the arrester produce excessive heat; the fusible layer 30, placed in the arrester region to respond to this heating, thereby fuses. As this occurs, spring fingers 27, and in particular the contact sections 27A thereof, move layer 35 into contact with layer 36 and center body 20A as the fusible layer 30 yields and flows. When electrical contact is made a short circuit is established between the respective end cap and the center body thus providing a fail-safe (short) action.

Additionally, the air gap 30A between layer 35 and layer 36 provides back-up protection in the event of gas tube failure. With this additional provision a failure of the gas tube in the open mode, as for example by reason of a gas leak, does not result in a loss of protection; the air gap provides back-up protection prior to arrester replacement.

FIGS. 6-15 illustrate still further modifications to the invention. In these embodiments the air gap devices 50 and 60, FIGS. 10 and 12 respectively, are arranged in longitudinal relationship on the gas tube 20 beneath the clips 25.

Figure 9:
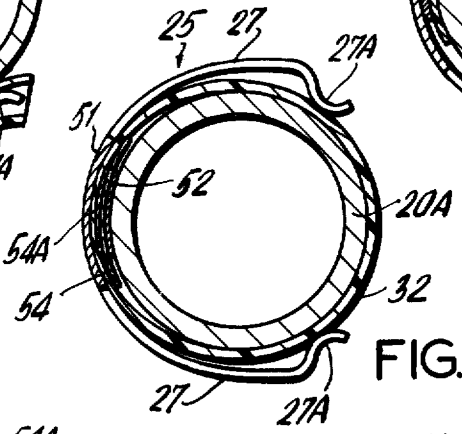
FIG. 9 is a cross-sectional view taken along line 9—9 in FIG. 6 and illustrating an air gap device and fusible member in the form of a cylindrical sleeve about the gas tube.

The fusible elements may take alternative forms. In FIG. 7, tubular sleeves 31 are arranged about the fingers 27 of clips 25 so that a layer of fusible material is interposed between contact sections 27A and center body 20A. In FIG. 9, a tubular sleeve 32 is arranged circumferentially about center body 20A to maintain contact section 27A of the clip in spaced relationship thereto. Additionally, sleeve 32 overlaps device 50 or 60 to retain the device on and in contact with center body 20A.

Figure 10:
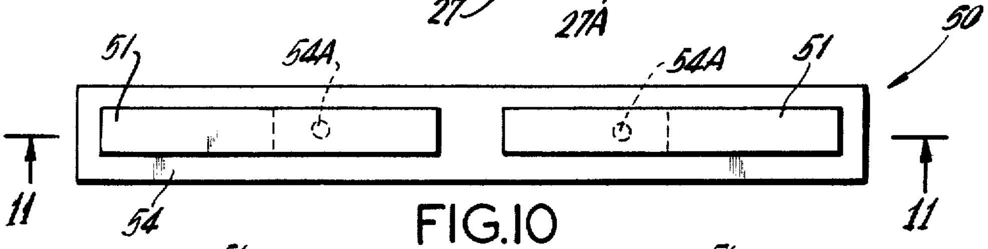
FIG. 10 is an enlarged plan view of an air gap device used in FIG. 6.
Figure 11:
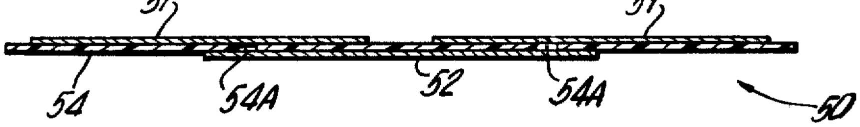
FIG. 11 is a longitudinal cross-sectional view taken along line 11—11 in FIG. 10.
Figure 12:
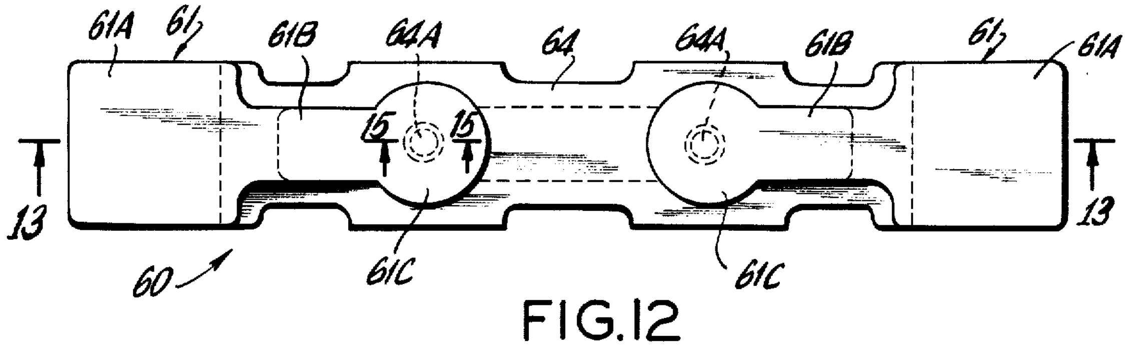
FIG. 12 is a top plan view of another air gap device similar to that illustrated in FIG. 10.
Figure 13:
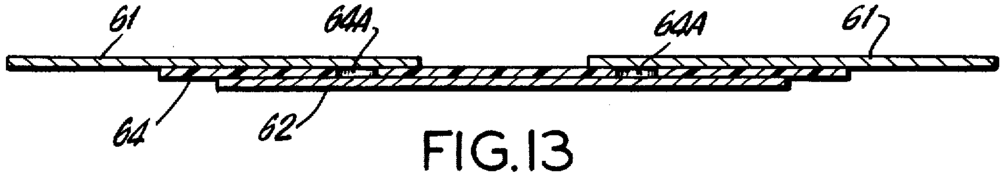
FIG. 13 is a longitudinal cross-sectional view taken along line 13—13 in FIG. 12.
Figure 14:
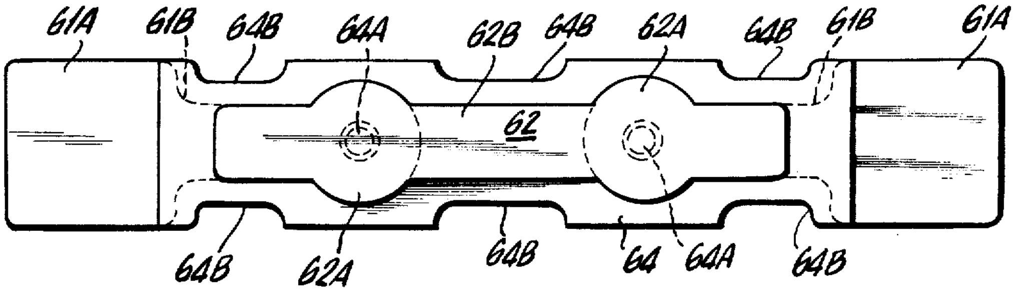
FIG. 14 is a bottom plan view of the embodiment in FIG. 12.

Air gap device 50, FIGS. 10 and 11, includes a first conductive layer 51 in the form of a rectangular layer of metallic conductor material, e.g. copper. Layer 51 is place in electrical contact with end cap 20B by clip 25. A second layer 52 of conductive material is in overlapping relationship with layer 51. Layer 52 is in direct contact with center body 20A. Interposed between layers 51 and 52 is a non-metallic layer 54 of insulating material. Layer 54 may be of the type previously described or a high melting point material, such as a polyimide, an exemplary example is the polyimide sold under the designation Kapton and may be surface coated with adhesive to secure layers 51 and 52. Layer 54 includes an aperture 54A therein to define an air gap between the overlapping portion of layers 51 and 52. Since gas tube 20 has two line electrodes, a pair of conductive layers 51 and associated air gaps 54A are provided. However, it will be understood that the device works equally well when the gas tube has one line electrode and one ground electrode.

In the air gap device 50, the insulating layer 54 extends beyond the periphery of both layers 51 and 52. Layers 51 and 52 may be fabricated by known methods, preferably by printed circuit techniques.

FIGS. 12–15 illustrate an air gap device similar to device 50 which has been modified to improve its contact and conforming characteristic with the gas tube 20 as well as facilitating and improving its fabrication and operation.

More specifically, each first conductive layer 61, e.g. copper, includes an end cap and/or clip contact portion 61A of generally rectangular shape. Portions 61A are placed in direct contact with their associated end caps (electrodes) 20B. A neck portion 61B connects portion 61A to a generally circular shape portion 61C overlying the air gap formed by aperture 64A described below.

Correspondingly, second conductive layer 62 includes two circular shaped portions 62A concentric with air gap 64A and interconnected by rectangular shaped portion 62B.

Insulating layer 64 is interposed between layers 61 and 62 and formed with cut-out portions 64B. These cut-out portions facilitate in the wrapping and conformance of the air gap device about the gas tube.

Figure 15:
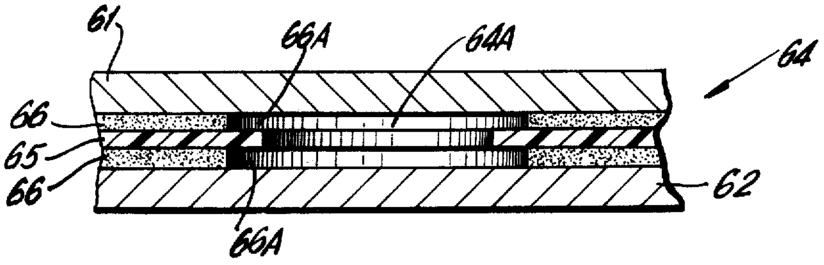
FIG. 15 is a cross-sectional view taken along line 15—15 in FIG. 12 and enlarged for clarity of illustration.

Moreover, with particular reference to FIG. 15, the insulating layer 64 includes a layer 65 of plastic material of the types described above and is faced on each surface with an adhesive layer 66 which bonds the layer 64 to the associated conductive layers 61 and 62. Preferably, the edges 66A of the adhesive layer adjacent the hole 64A in the plastic layer 65 is set back a short distance. By way of illustration, with a hole diameter of 0.05 inch in the plastic layer 65, a set back of 0.005 inch provides sufficient clearance. The set back clearance ameliorates the possibility of the adhesive flowing into the air gap during assembly. Moreover, the air gap dimension, e.g. 3 mils, must take into account the thickness of the adhesive, for example when the adhesive layers 66 are 1 mil thick, a plastic layer 65 of 1 mil is used to achieve a 3 mil air gap. The set of the adhesive also functions to prevent bridging or short circuiting of the air gap which might occur as a result of electrical discharges if the adhesive entered the air gap.

The operation of the arrester assembly of FIGS. 6–15 is similar to that previously described. During normal operation of the arrester 20, transient surges produce ionization in the normal manner to protect the subject equipment. If a sustained surge condition occurs, the resultant ionization currents flowing through the arrester produce excessive heat; the sleeves 31 or 32, placed in the arrester region to respond to this heating, thereby fuse. As this occurs, spring fingers 27 move into contact with center body 20A as the fusible sleeve material beneath those contacts yields and flows. When electrical contact is made a short circuit is established between the respective end cap and the center body thus providing a fail-safe (short circuiting) action.

Non-metallic materials other than the foregoing may be used as the fusible members provided they have appropriate electrical insulation properties and undergo a predictable change of mechanical properties under the specified overload condition to permit the short circuiting action to occur.

Moreover, the air gaps 54A or 64A provide back-up protection in the event of failure of the gas tube.

Figure 6:
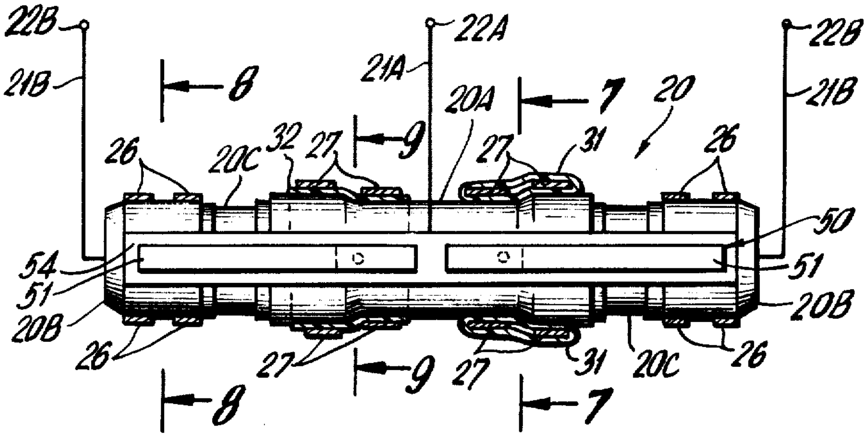
FIG. 6 is a plan view, partly in schematic and partly in cross-section, of a gas filled arrester of the second embodiment.

To facilitate use in a wide variety of applications, the arrester assembly of FIGS. 1 & 6 may be potted in a modular shell, the potting material therein being an epoxy compound. Prior to the potting the arrester assembly may be wrapped and voids filled with PTFE or equivalent material (not shown). Alternatively, the arrester assembly may be used in a station protector configuration well known in the art. Obviously, the present invention is useful with gas tube arrester having more or less number of electrodes than the three electrode tube arrester shown. The ability to provide an air gap which is sealed from the enviorns by the laminar construction described provides a significant advance.

These modifications and others may be made by those skilled in the art without departing from the scope and spirit of the present invention as pointed out in the appended claims.

What is claimed is:

1. An air gap surge arrester comprising:

a sealed laminar assembly having first and second layers of electrically conductive metallic material, a portion of said conductive layers being in overlapping relationship, and an intermediate insulating layer interposed between and bonded to said first and said second layers, said insulating layer having a predetermined aperture in the area of overlap between said conductive layers, whereby an air gap is established between said first and said second layers; and means enveloping said laminar assembly for urging the respective layers of said laminar assembly towards one terminal of a device to be protected from an electric surge, a second terminal of said device being electrically coupled directly to said urging means.

2. An air gap surge arrester of claim 1, wherein said first and second laminar layers are coextensive in dimensions and in register at their peripheries.

3. An air gap surge arrester of claim 2, wherein said insulating layer extends beyond the periphery of said first and second layers.

4. An air gap surge arrester of claim 1, wherein said first and second laminar layers are copper.

5. An air gap surge arrester of claim 1, wherein said intermediate layer is a heat shrinkable plastic material.

6. An air gap surge arrester of claim 1, wherein said insulating layer aperture is circular in cross-section and the portion of said conductive layers overlapping said aperture have a generally circular shape concentric with said aperture.

7. An air gap surge arrester of claim 1, wherein said intermediate layer includes an adhesive on each surface in the area surrounding said aperture, said adhesive being set back a predetermined distance from the edge of the aperture.

8. An air gap surge arrester of claim 1, wherein said air gap is about 3 mils.

9. An air gap surge arrester of claim 1, wherein the strike voltage is in the range of about 500 to 1000 volts.

10. An air gap surge arrester of claim 1, wherein said intermediate layer is a fusible material.

11. An air gap surge arrester of claim 1, wherein said intermediate layer is a meltable fluoropolymer.

12. An air gap surge arrester of claim 1, wherein said first and second layers and intermediate layer are generally rectangular in shape.

13. An air gap surge arrester of claim 1, further including a third layer of conductive material located in longitudinal spaced relationship from said first layer and overlapping at least a portion of said second layer, said intermediate layer having another predetermined air gap between said second and third layers, whereby an air gap is established between said second and third layers.

14. An air gap surge arrester of claim 13, wherein said insulating layer extends beyond the periphery of said conductive layers.

15. An air gap surge arrester of claim 13, wherein said laminar assembly extends in a longitudinal direction from said first terminal toward said second terminal, and wherein said first and said third layers extend in the longitudinal direction beyond the ends of said insulating layer.

16. An air gap surge arrester of claim 15 wherein said insulating layer extends in the longitudinal direction beyond the ends of said second layer.

17. An air gap surge arrester of claim 13, wherein said insulating layer apertures are circular in cross-section and the portions of said conductive layers overlapping said apertures have a generally circular shape concentric with their associated aperture.

18. An air gap surge arrester of claim 13, wherein said intermediate layer includes an adhesive on each surface in the area surrounding said apertures, said adhesive being set back a predetermined distance from the edge of the associated apertures.

19. An air gap surge arrester comprising:

a sealed laminar assembly having first and second layers of electrically conductive metallic material, a portion of said conductive layers being in overlapping relationship, and an intermediate insulating layer interposed between and bonded to said first and said second layers, said insulating layer having a predetermined aperture in the area of overlap between said conductive layers, whereby an air gap is established between said first and said second layers; and a third layer of conductive material located in longitudinal spaced relationship from said first layer and overlapping at least a portion of said second layer, said intermediate layer defining an air gap between said second and said third layers;

said first and said third layers extending in a longitudinal direction beyond the ends of said insulating layer, and wherein said insulating layer extends in a transverse direction, perpendicular to said longitudinal direction, beyond peripheral portions of said conductive layers.

20. A combination fail safe and air gap device for use with a gas filled surge arrester comprising:

a laminar assembly of first and second metallic electrically conductive layers, said layers being in overlapping relationship, and an intermediate layer of non-metallic fusible material interposed between and in contact with said first and said second layers to prevent short circuiting therebetween except in the presence of a sustained overload causing said fusible material to fuse and yield to permit establishment of a short circuit between said first and said second layers, said intermediate layer having at least one predetermined aperture therein in the area of overlap between said first and said second layers to define an air gap electrode therebetween; and an electrically conductive member connected to said laminar assembly and adapted for connection with a terminal of said surge arrester.

21. A device of claim 20, wherein said first and second layers and insulating layer are rectangular in shape.

22. A device of claim 20, wherein said insulating layer extends beyond the periphery of said first and second layers.

23. A device of claim 20, wherein said first and second layers are coterminous in dimensions and arranged in register.

24. A device of claim 20, wherein said first and second layers are copper.

25. A device of claim 20, wherein said intermediate layer is a heat shrinkable plastic material.

26. A device of claim 25, wherein said intermediate layer is a meltable fluoropolymer.

27. In a surge arrester assembly having a gas filled surge arrester including at least two electrodes defining an ionization gap and short circuit clamp means biased towards a short circuit connection with said electrodes, the improvement comprising:

safety means interposed between said one electrode and said short circuit clamp means, said safety means including first and second layers of metallic, electrically conductive material in contact with said clamp means and electrode, respectively, and an intermediate layer of fusible material interposed between said first and second layers, said intermediate layer defining an aperture therein to provide an air gap and operative to prevent said short circuit connection except in the presence of a sustained overload causing said fusible layer to fuse and yield to permit said short circuit means to bias said first layer into short circuit connection with said second layer.

28. An assembly of claim 27, wherein said gas filled surge arrester with two line electrodes and a ground electrode, said assembly including safety means for each line electrode located on said ground electrode.

29. An assembly of claim 27, wherein said intermediate layer is a meltable fluoropolymer.

30. A total fail safe surge arrester assembly having a gas filled surge arrester including at least two electrodes defining an ionization gap, and short circuit clamp means biased toward a short circuit connection with said electrodes, the improvement comprising:

air gap means interposed between a portion of said short circuiting clamp means and each of said electrodes, said air gap means including a first layer of metallic material in electrical contact with said clamping means and a second layer of metallic material in electrical contact with one of said electrodes and in overlapping relationship with said first layer; a layer of insulating material interposed between the overlapping portions of said metallic layers and defining an aperture therein to provide an air gap;

non-metallic fusible means in thermal contact with said ionization gap and interposed between said clamp means and one of said electrodes to prevent short circuit connection except in the presence of sustained overload causing said fusible means to fuse and yield to permit establishment of said short circuit connection.

31. An assembly of claim 30, wherein said air gap means and fusible means are located at the same electrode.

32. An assembly of claim 31, wherein said first layer is in direct contact with the other of said electrodes and said clamp means.

33. An assembly of claim 31, wherein said layer of insulating material is said fusible means.

34. An assembly of claim 31, wherein said fusible means is a sleeve positioned on said same electrode.

35. An assembly of claim 31, wherein said fusible means comprises a meltable fluoropolymer.

36. An air gap electrode device of claim 1, wherein said intermediate layer is polyimide.

* * * * *